(12) United States Patent
Gaucher et al.

(10) Patent No.: US 12,012,077 B2
(45) Date of Patent: Jun. 18, 2024

(54) ADAPTER FOR A WIPER SYSTEM

(71) Applicant: Valeo Systemes d'Essuyage, Le Mesnil Saint Denis (FR)

(72) Inventors: Vincent Gaucher, Le Mesnil Saint Denis (FR); Stephane Houssat, Le Mesnil Saint Denis (FR); Eric Poton, Le Mesnil Saint Denis (FR); Olivier Jomard, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/901,118

(22) Filed: Sep. 1, 2022

(65) Prior Publication Data

US 2023/0166692 A1 Jun. 1, 2023

(30) Foreign Application Priority Data

Sep. 1, 2021 (FR) ........................................ 2109139

(51) Int. Cl.
*B60S 1/40* (2006.01)
*B60S 1/38* (2006.01)

(52) U.S. Cl.
CPC ........... *B60S 1/4087* (2013.01); *B60S 1/3849* (2013.01); *B60S 1/4048* (2013.01); *B60S 1/4083* (2013.01)

(58) Field of Classification Search
CPC .... B60S 1/4083; B60S 1/4087; B60S 1/3849; B60S 1/3863; B60S 1/3868; B60S 1/3865
USPC ..................................................... 15/250.32
See application file for complete search history.

(56) References Cited

FOREIGN PATENT DOCUMENTS

| DE | 202018006136 U1 | 4/2019 |
|----|-----------------|--------|
| DE | 202018006137 U1 | 4/2019 |
| DE | 202018006138 U1 | 4/2019 |
| DE | 102019211328 A1 | 1/2020 |
| WO | 2016/119852 A1 | 8/2016 |
| WO | 2017/220374 | * 12/2017 |

OTHER PUBLICATIONS

Machine translation of description portion of German publication 202018006137, published Jun. 2019. (Year: 2019).*
Preliminary Search Report and Written Opinion in corresponding French Application No. 2109139, dated May 13, 2022 (6 pages).

* cited by examiner

*Primary Examiner* — Gary K. Graham
(74) *Attorney, Agent, or Firm* — Osha Bergman Watanabe & Burton LLP

(57) ABSTRACT

The present invention relates to an adapter (1) for a wiper system (6), comprising at least a side wall (10) and an upper wall (12) having at least one common edge between them, the side wall (10) and the upper wall (12) helping to define an inner volume of the adapter (1), the adapter (1) comprising a first inner wall (20) and a second inner wall (66) helping to delimit, at least partially, a receiving area (26) intended to receive the connector (8), the adapter (1) comprising at least one receiving housing (32) which is intended to receive the arm and which has a rectangular cross section defined by two major sides (33) and two minor sides (31), characterized in that a straight line (D) passing through one of the major sides (33) cuts the receiving area (26) intended to receive the connector (8).

15 Claims, 4 Drawing Sheets

[Fig. 1]
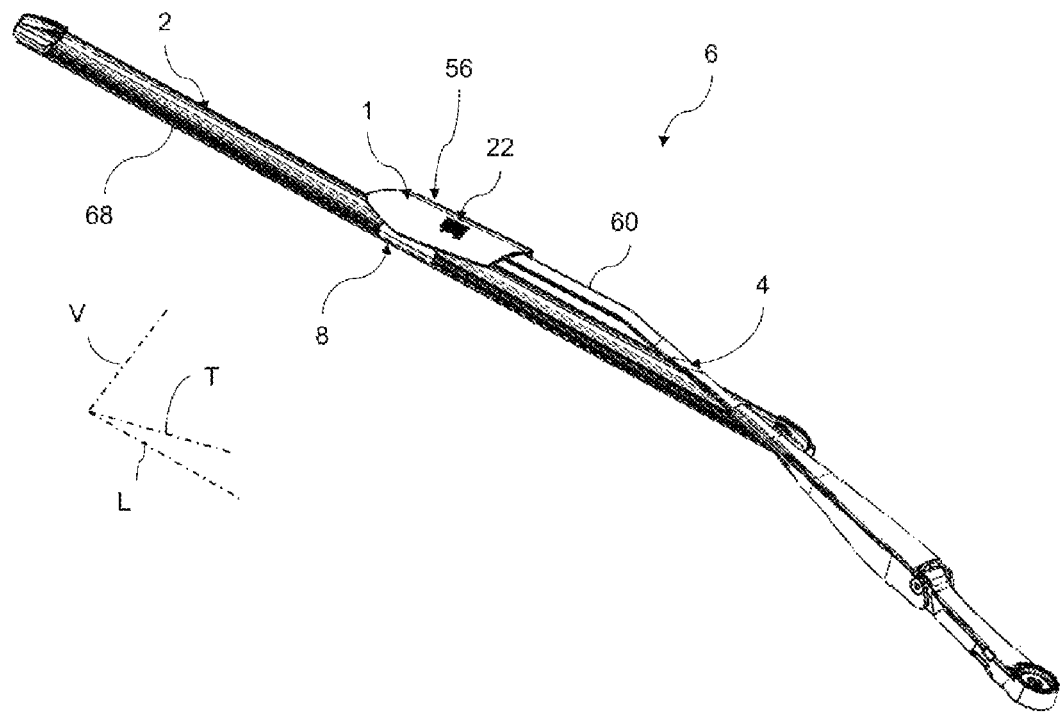
[Fig. 2]
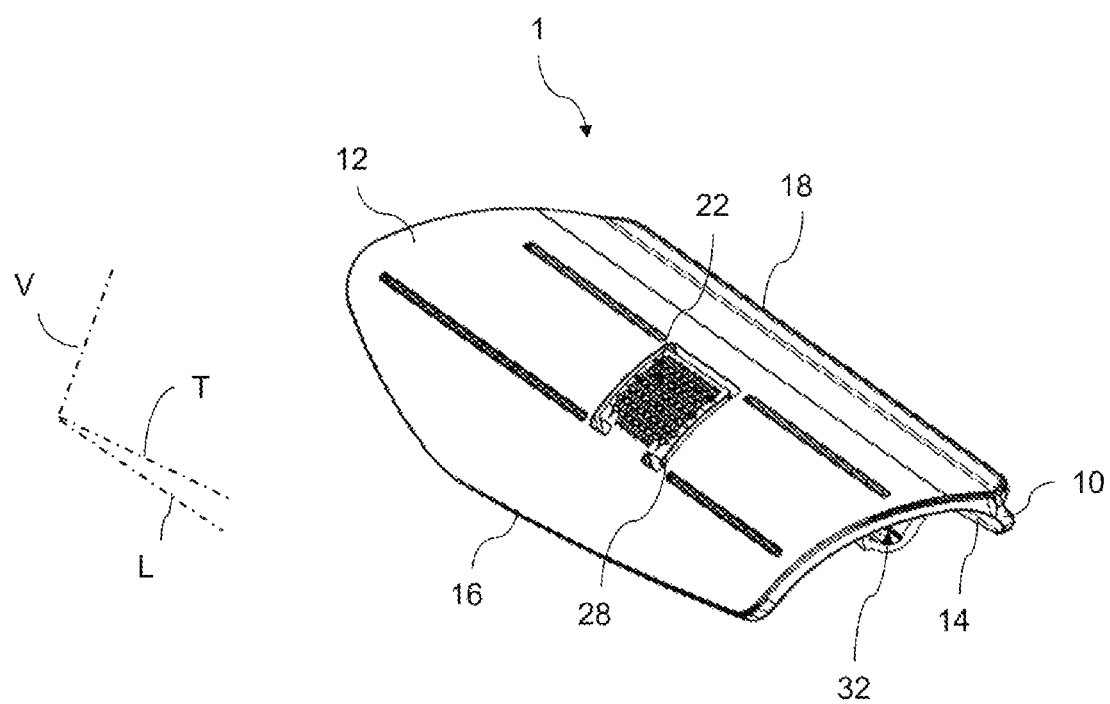

[Fig. 3]
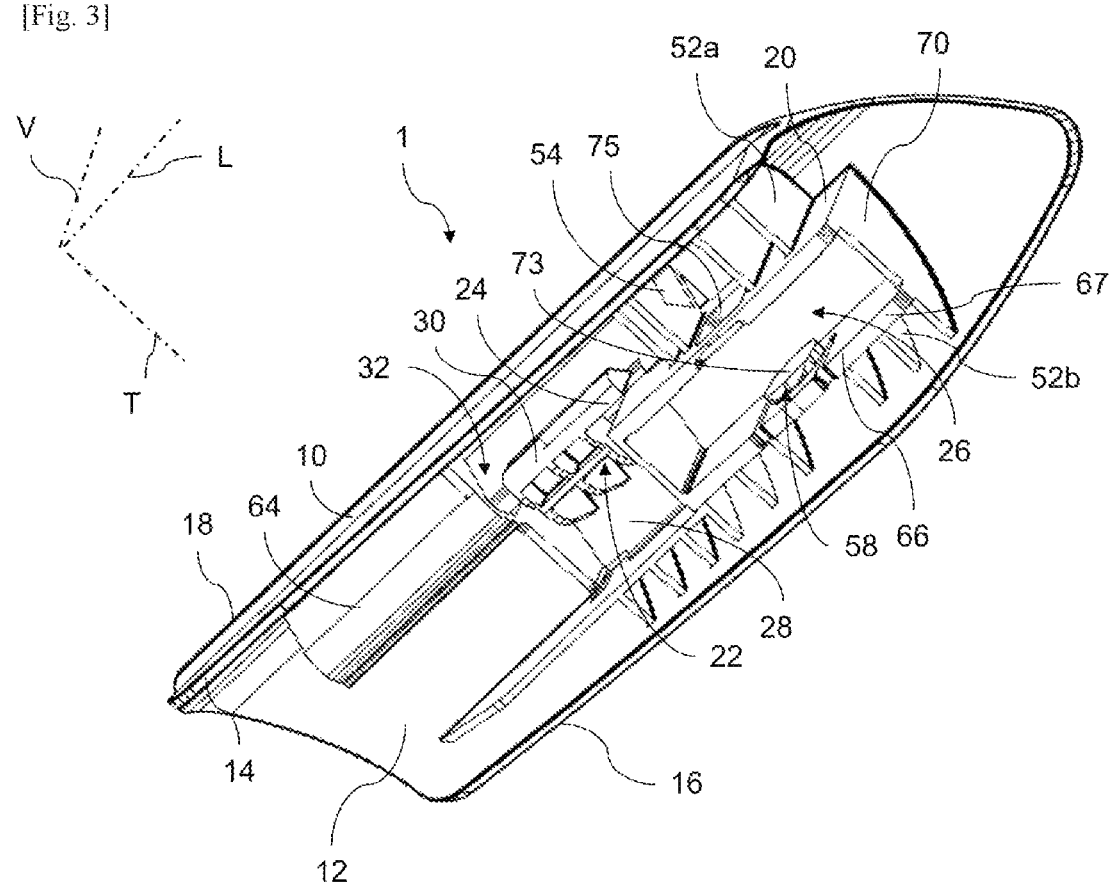

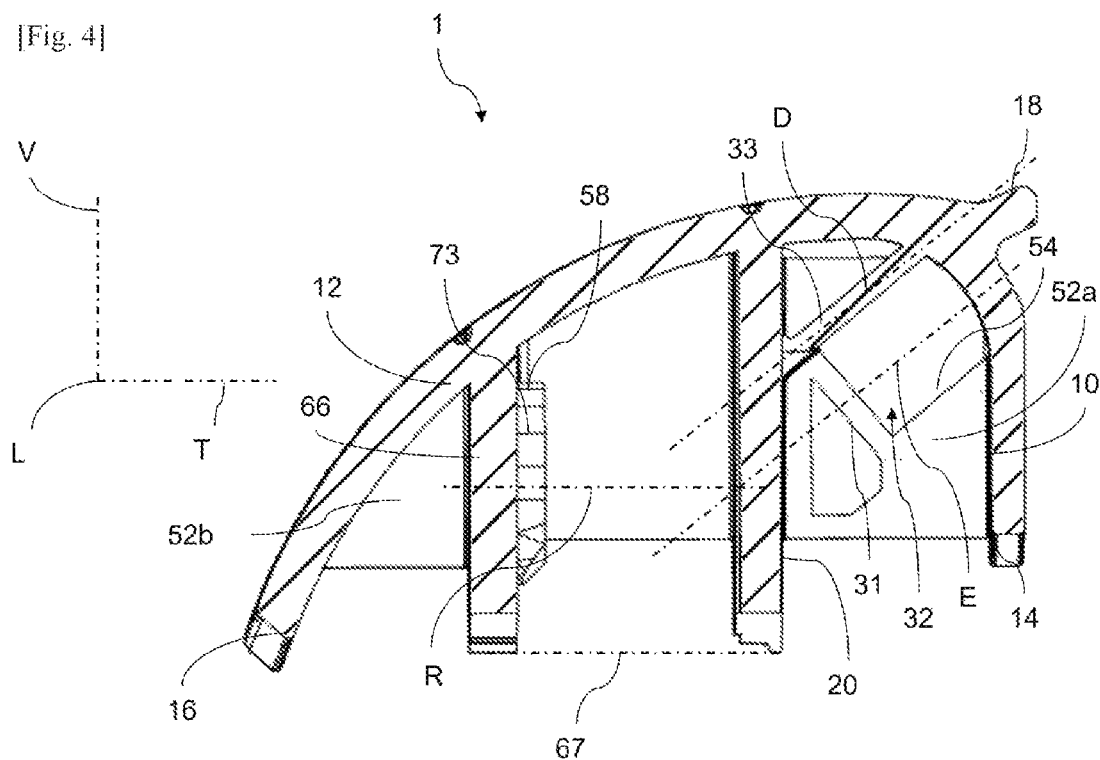
[Fig. 4]

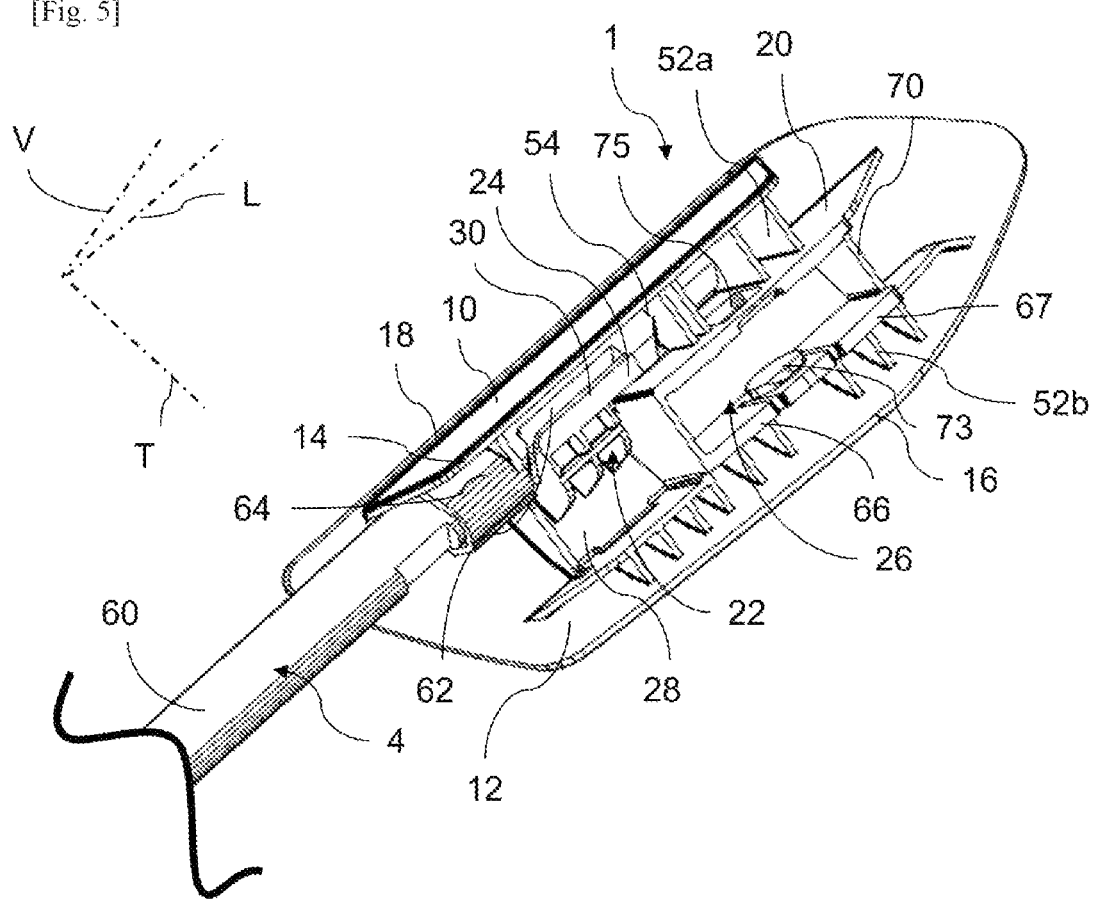

ADAPTER FOR A WIPER SYSTEM

The field of the present invention is that of wiper systems intended for motor vehicles. More particularly, the field of the present invention is that of adapters positioned between a windscreen wiper arm and a wiper blade unit in such wiper systems.

Motor vehicles are commonly fitted with wiper systems for cleaning their glazed surfaces, and notably their windscreens. Such wiper systems comprise at least a windscreen wiper arm and a wiper blade unit driven by the windscreen wiper arm. The windscreen wiper arm is connected to an electric motor of the vehicle, and the wiper blade unit comprises at least one wiper blade adapted to come into contact with the glazed surface to be wiped. To enable the wiper blade unit to be driven, an adapter is arranged between this wiper blade unit and the windscreen wiper arm. More particularly, the adapter is arranged between the windscreen wiper arm and a connector attached to the wiper blade unit. The adapter is then fixed to the windscreen wiper arm, and more particularly to a free end of the windscreen wiper arm, this attachment being detachable so that the wiper blade unit can be changed when it is worn.

To provide optimal cleaning of the glazed surfaces of vehicles by means of wiper systems, said wiper systems and notably their wiper blade units, must be pressed against the glazed surface to be cleaned. Consequently, there are known means for helping to press the wiper blade units, such as deflectors placed on the wiper blade units and causing them to be pressed by the action of an air flow when the vehicle is in motion. However, although the pressing of the wiper blade units is effective, it is not optimal, and may therefore be improved.

The present invention proposes an alternative to the existing solutions, by positioning the various fastening elements with respect to each other so as to optimize the pressing of the wiper blade unit against the glazed surface of the vehicle.

In this context, the main object of the present invention is an adapter for fastening a wiper blade unit to an arm of a wiper system, the adapter extending in a longitudinal direction, the adapter being configured to be mounted rotatably on a connector of a wiper blade unit about an axis of rotation transverse to the longitudinal direction, the adapter comprising at least a lateral wall and an upper wall having at least one common edge between them, the lateral wall and the upper wall helping to define an inner volume of the adapter, the adapter comprising a first inner wall and a second inner wall extending at least partially into the inner volume of the adapter and helping to delimit at least a part of a receiving area intended to receive the connector, the adapter comprising at least one receiving housing which is intended to receive the arm of the wiper system and which has a rectangular cross section defined by two major sides and two minor sides, characterized in that a straight line passing through one of the major sides cuts the receiving area intended to receive the connector.

The wiper blade unit and the arm form part of a wiper system of a vehicle, for cleaning, at least partially, a glazed surface of said vehicle. The wiper system also comprises the arm which is driven in rotation by an electric motor of the vehicle and which provides the rotary movement of the wiper blade unit, to which it is fixed by means of the adapter and the connector, against the glazed surface, so that the blade carried by the wiper blade unit clears said glazed surface of raindrops and/or solid debris deposited on said surface.

The receiving housing extends in the inner volume of the adapter in such a way that a straight line passing through one of the major sides of the receiving housing also extends into the receiving area. It is to be understood that, although the straight line extends into at least a part of the receiving area, it does not pass through said receiving area along a principal dimension.

The straight line is also inclined with respect to a main plane of elongation of the first inner wall, of the second inner wall and/or of the lateral wall, for example. In other words, the straight line is at least secant with respect to a main plane of elongation of the first inner wall, of the second inner wall and/or of the side wall.

This ingenious arrangement of the receiving housing with respect to the receiving area makes it possible to reduce the overall dimensions of the components of the adapter even within the inner volume of the adapter, the receiving housing being positioned nearer to the adapter than in the known art. This also optimizes the pressure of the wiper blade unit on a glazed surface, while stabilizing the position of the wiper blade unit with respect to the arm and reducing the disturbance due to air flow.

For its part, the receiving area is transversely delimited by the first inner wall and by the second inner wall, longitudinally by two side walls, and, finally, vertically by the upper wall and by an opening delimited by a free edge of the inner walls and of the side walls. It is to be understood here that the straight line thus passes through the receiving area defined by the set of components delimiting the receiving area.

According to an optional feature of the invention, the straight line passing through one of the major sides is secant to the axis of rotation of the adapter within the receiving area.

According to an optional feature of the invention, the adapter is configured to be mounted rotatably on a connector by means of a rotation device, the straight line passing through one of the major sides cutting one of the elements of the rotation device.

According to an optional feature of the invention, the side wall and the upper wall each have a free edge and an edge common to the side wall and the upper wall, the adapter having a triangular cross section when viewed in a section plane perpendicular to the longitudinal direction and defined by the free edge of the side wall, the free edge of the upper wall and the common edge between the side wall and the upper wall, the upper wall being curved between the common edge and its free edge when viewed in the section plane perpendicular to the longitudinal direction.

The free edge of the upper wall is also the edge positioned across the air flow when the wiper system is positioned on the vehicle, the air flow streaming over the upper wall. In other words, the free edge of the upper wall is the foremost edge with respect to the vehicle when the wiper system is mounted on said vehicle. Thus it is to be understood that the free edge of the side wall and the side wall itself are positioned at the rear of the wiper system, between the glazed surface and the free edge of the upper wall, with respect to a trajectory of the air flow, when the wiper system is mounted on the vehicle.

According to another optional feature of the invention, the adapter comprises at least one reinforcer extending between the first inner wall and the side wall and/or the upper wall.

According to another optional feature of the invention, the receiving housing is defined by a first portion comprising a sleeve.

According to another optional feature of the invention, the receiving housing is defined by a second portion opening into the inner volume.

According to another optional feature of the invention, the receiving housing is defined by a third portion comprising an opening formed in the reinforcer.

According to another optional feature of the invention, the adapter comprises at least one reinforcer extending between the first inner wall and the side wall and/or the upper wall, the receiving housing being defined by a first portion comprising a sleeve, by a second portion opening into the inner volume, and by a third portion comprising an opening formed in the reinforcer.

The sleeve comprises a wall helping to delimit at least a part of the first portion of the receiving housing, said wall extending longitudinally in the form of a hollow cylinder.

The opening formed in the reinforcer has an overall shape similar to a cross section of the sleeve viewed in a plane perpendicular to the longitudinal direction. Additionally, the opening formed in the reinforcer and the sleeve are aligned along a direction parallel to the longitudinal direction.

According to another optional feature of the invention, the reinforcer extends perpendicularly with respect to the first inner wall and/or the side wall.

According to another optional feature of the invention, the adapter comprises a first series of reinforcers that extend between the upper wall, the side wall and the first inner wall, and a second set of reinforcers that extend between the upper wall and the second inner wall, helping to define the receiving area, said receiving area extending between the first series of reinforcers and the second series of reinforcers.

The receiving area is, for example, delimited by the first inner wall and by the second inner wall extending separately and parallel to the first inner wall.

According to another optional feature of the invention, the receiving housing is laterally offset with respect to the receiving area. This lateral offset optimizes the compactness of the aforementioned adapter.

According to another optional feature of the invention, a position of the receiving housing is offset with respect to a position of the receiving area along a transverse direction, the latter being perpendicular to the longitudinal direction.

According to another optional feature of the invention, the receiving housing is positioned in the inner volume between the receiving area and the side wall.

According to another optional feature of the invention, the straight line passing through one of the major sides is secant to the axis of rotation of the adapter at an angle of between 20° and 60°, preferably between 30° and 50°, and even more preferably between 35° and 45°.

According to another optional feature of the invention, the adapter comprises a locking device intended for fixing the adapter longitudinally with respect to the arm of the wiper system, the locking device comprising at least one pushing member and a locking member, the pushing member lying within a profile of the upper wall, while the locking member extends at least partially into the receiving housing intended to receive the arm.

The invention also relates to a connection device for a wiper blade unit, comprising at least a connector and an adapter according to any of the above features, the connector being mounted rotatably about the axis of rotation of the adapter by means of a rotation device.

The invention also proposes a wiper blade unit comprising at least a connection device according to any of the above features, or an adapter according to any of the above features.

Finally, the invention relates to a wiper system comprising at least an arm and a wiper blade unit according to any of the preceding claims, the arm comprising at least one stalk that is housed in the receiving housing of the adapter. Here, the term "stalk" is taken to mean a solid elongate element having, for example, a rectangular cross section when viewed in a plane perpendicular to a main direction of elongation of the stem.

According to another optional feature of the invention, at least one end of the stalk is made in a shape complementary to the receiving housing of the adapter, the stalk having a cut-out interacting with the locking device for longitudinally locking the position of the adapter on the stalk.

Other features, details and advantages of the invention will be more fully apparent from a reading of the following description on the one hand, and on the other hand a number of examples of embodiment provided for guidance in a non-limiting way, with reference to the attached schematic drawings, in which:

FIG. 1 is a perspective view of a wiper system comprising at least an arm, a wiper blade unit and an adapter according to the invention;

FIG. 2 is a perspective view from above of the adapter shown in FIG. 1;

FIG. 3 is a perspective view from below of the adapter shown in FIG. 1;

FIG. 4 is a cross section through the adapter shown in FIG. 1;

FIG. 5 is a perspective view from below of the adapter and of the arm shown in FIG. 1.

The features, variants and different embodiments of the invention may be combined with one another, in various combinations, as long as they are not mutually incompatible or mutually exclusive. In particular, variants of the invention can be contemplated that only comprise a selection of features that are described hereafter independently of the other features described, if this selection of features is sufficient to provide a technical advantage and/or to differentiate the invention from the prior art.

In the figures, elements that are common to several figures retain the same references.

In the following detailed description, the terms "longitudinal", "transverse" and "vertical" refer to the orientation of a wiper system according to the invention. A longitudinal direction is a main direction of elongation of an adapter according to the invention, this longitudinal direction being parallel to a longitudinal axis L of a reference frame L, V, T shown in the figures. A transverse direction is a direction along which a reinforcer mainly extends, this transverse direction being parallel to a transverse axis T of the reference frame L, V, T and this transverse axis T being perpendicular to the longitudinal axis L. Finally, a vertical direction is a direction parallel to a vertical axis V of the reference frame L, V, T, this vertical axis V being perpendicular to the longitudinal axis L and the transverse axis T.

FIG. 1 shows a wiper system 6 configured for cleaning a glazed surface of a vehicle, for example a windscreen, so as to improve a driver's view of the road in front of the vehicle, in rainy weather for example, or for the purpose of clearing said glazed surface from solid debris clinging to said surface. The wiper system 6 extends mainly along the longitudinal direction L, and comprises at least a wiper arm 4 carrying a wiper blade unit 2 at one end, and being connected at another end which is opposite with respect to the longitudinal direction L of the vehicle.

The arm 4 and the wiper blade unit 2 both extend mainly in the longitudinal direction L of the wiper system 6. More precisely, the arm 4 comprises a connecting body for fixing the arm 4 of the vehicle to a stalk 60 extending from the connecting body to an end of the arm 4. The term "stalk" is taken to mean a solid element elongated along the longitudinal direction L. The stalk 60 here has a rectangular cross section viewed in a plane perpendicular to the longitudinal direction L. However, a stalk 60 having a discoid, triangular or other cross section would not lie outside the scope of the invention.

Additionally, the wiper blade unit 2 is also notably adapted for being driven in rotation by the arm 4 against the glazed surface of the vehicle, the arm 4 being itself driven in rotation by a motor which is not shown, for example an electric motor carried on the vehicle.

For the purpose of connecting the wiper blade unit 2 to the end of the arm 4, said wiper blade unit 2 comprises a connection device 56 comprising at least a connector 8 that carries a wiper blade 68 of the wiper blade unit 2 and an adapter 1 mounted rotatably on the connector 8, the adapter 1 being capable of interacting with the end of the arm 4. It is to be understood, notably, that the blade of the wiper blade unit 2 is intended to come into contact with the glazed surface of the vehicle. Furthermore, the connector 8 is configured to carry the blade, directly or indirectly.

The rotation of the adapter 1 and of the connector 8 is provided by means of a rotation device, this rotation taking place about an axis of rotation R substantially parallel to the transverse direction T. A more detailed description of the rotation device is given in the subsequent part of the description.

As may be seen more particularly in FIGS. 2 and 3, the adapter 1 extends mainly along the longitudinal direction L. The adapter 1 comprises at least a side wall 10 and an upper wall 12, the side wall 10 and the upper wall 12 each having a free edge 14, 16 and an edge 18 common to the side wall 10 and to the upper wall 12.

The side wall 10 extends mainly in a plane parallel to the longitudinal direction L and the vertical direction V. The side wall 10 here has a free edge 14 and a common edge 18 with the upper wall 12, the common edge 18 joining the side wall 10 and the upper wall 12, each of which extend in separate planes.

The upper wall 12 also has a free edge 16, and extends between its free edge 16 and the common edge 18, having a curve that is particularly visible in FIG. 4. It is to be understood here that the upper wall 12 has a curved profile between the common edge 18 and its free edge 16, viewed in the plane perpendicular to the longitudinal direction L, which is inscribed in a circle.

In this configuration, the adapter 1 has a triangular cross section viewed in a plane perpendicular to the longitudinal direction L, the triangle of this cross section being defined by the free edge 14 of the side wall 10, the free edge 16 of the upper wall 12, and the common edge 18 between the side wall 10 and the upper wall 12. Thus an inner volume of the adapter 1 may be defined, this inner volume being at least partially delimited by the side wall 10 and the upper wall 12. The inner volume extends mainly in the form of a right prism having a triangular base.

Additionally, as shown more particularly in FIGS. 3 to 5, the adapter 1 comprises a first inner wall 20 extending at least partially in the inner volume of the adapter 1. More precisely, the first inner wall 20 extends in a plane substantially parallel to the longitudinal direction L and the vertical direction V, from the upper wall 12, in the inner volume. It is to be understood that the first inner wall 20 extends substantially parallel to the side wall 10.

According to the invention, the first inner wall 20 helps to delimit, at least partially, a receiving area 26 intended to receive the connector 8. When the adapter 1 is mounted on the connector 8, the connector 8 is at least partially housed in the receiving area 26.

Additionally, as shown more particularly in FIGS. 3 to 5, the adapter 1 comprises a plurality of walls helping to delimit the receiving area 26, including, notably, the first inner wall 20. More particularly, these walls extend to form a rectangle, the walls extending in a plane substantially perpendicular to the planes in which neighbouring walls extend. It is to be understood, therefore, that the adapter 1 comprises a second inner wall 66, extending parallel to the first inner wall 20, and two side walls 70, extending perpendicularly to the longitudinal wall 66 and inner wall 20 and between the latter.

It may also be defined that the receiving area 26 is delimited transversely between the first and second inner walls 20, 66, longitudinally between the side walls 70, and vertically by the upper wall 12 and by an opening 67 defined by the free edges of the inner walls 20, 66 and the side walls 70.

Additionally, the connector 8, when mounted on the adapter 1, is at least partially positioned in the receiving area 26 of the adapter 1. In other words, the connector 8 is positioned at least partially between the first inner wall 20 and the second inner wall 66, and between the side walls 70.

As mentioned above, the adapter 1 is mounted rotatably on the connector 8 by means of a rotation device 58. This rotation device comprises a plurality of elements interacting with each other and positioned, on the one hand, on the connector 8, and, on the other hand, on the adapter 1.

For example, and as shown in FIGS. 3 and 4, the adapter 1 comprises, on the one hand, a male element 73 on the second inner wall 66 configured for interacting with a female element of the connector 8, and, on the other hand, a female element 75 intended to interact with a male element of the connector 8.

More precisely, the male elements take the form of a tab carrying a stub, and the female elements take the form of an opening in which the stub is intended to be driven in rotation about the axis of rotation R. The tab of the adapter 1 extends, for example, in a plane coinciding with the plane in which the second inner wall 66 extends, and is delimited from said second inner wall 66 by two grooves extending along the vertical direction V. In this configuration, the tab is elastically deformable by being movable about a direction of rotation parallel to the longitudinal direction L, thus enabling the adapter 1 to be mounted on the connector 8.

Additionally, the adapter 1 comprises at least one reinforcer 52 extending between the first inner wall 20 and the side wall 10 and/or the upper wall 12. Advantageously, and as shown in FIGS. 3 and 5, the adapter 1 comprises a first series of reinforcers 52a that extend between the upper wall 12, the side wall 10 and the first inner wall 20, and a second set of reinforcers 52b that extend between the upper wall 12 and the second inner wall 66, helping to define the receiving area 26, said receiving area 26 extending between the first series of reinforcers 52a and the second series of reinforcers 52b.

The reinforcers 52 of the first series of reinforcers 52a are positioned between the receiving area 26, the upper wall 12 and the lateral wall 10, being aligned with each other along a direction parallel to the longitudinal direction L. Additionally, each of the reinforcers 52 of the first series of reinforcers 52a advantageously extends in a plane parallel to the planes in which the reinforcers 52 of said first set of reinforcers 52a extend.

The reinforcers 52 of the second series of reinforcers 52b are positioned between the receiving area 26 and the upper wall 12, being aligned with each other along a direction parallel to the longitudinal direction L. Additionally, each of the reinforcers 52 of the second series of reinforcers 52b advantageously extends in a plane parallel to the planes in which the reinforcers 52 of said second set of reinforcers 52b extend.

Preferably, each of the reinforcers 52 of the first series of reinforcers 52a and the second series of reinforcers 52b advantageously extends in a plane parallel to the planes in which the reinforcers 52 of said first series of reinforcers 52a and said second set of reinforcers 52b extend.

Additionally, the reinforcers 52 of the first series of reinforcers 52a and the second series of reinforcers 52a extend perpendicularly to the first inner wall 20 and/or to the side wall 10.

The adapter 1 also comprises a receiving housing 32 intended to receive the stalk 60 of the arm 4.

As shown in FIGS. 3 and 5, the receiving housing 32 is defined here by a first portion in the form of a sleeve 64, by a second portion opening into the inner volume, and by a third portion in the form of an opening 54 formed in a reinforcer 52 of the first series of reinforcers 52a. During assembly, the adapter 1 is mounted on the arm 4 so that a free end of the stalk 60 passes initially through the first portion, then through the second portion and finally through the third portion. It is to be understood here that the opening 54 is intended to receive at least a part of the stalk 60 of the arm 4, and notably a free end of the stalk 60 of the arm 4.

The sleeve 64 comprises a wall helping to delimit at least a part of the first portion of the receiving housing 32, said wall extending longitudinally in the form of a hollow cylinder.

The opening 54 formed in the reinforcer 52 has an overall form similar to a cross section of the sleeve 64 viewed in a plane perpendicular to the longitudinal direction. Additionally, the opening 54 formed in the reinforcer 52 and the sleeve 64 are aligned along a direction parallel to the longitudinal direction L.

In this arrangement, and as shown more particularly in FIG. 5, the opening 54 of the reinforcer 52 and the sleeve 64 are aligned along a direction parallel to the longitudinal direction L, the stalk 60 of the arm 4 therefore extending along the longitudinal direction L through the sleeve 64 and the opening 54 of the reinforcer 52.

Additionally, the reinforcer 52, in which the opening 54 for receiving the free end of the stalk 60 is formed, is the proximal reinforcer 52 of the first series of reinforcers 52a with respect to the sleeve 64.

Advantageously, at least two reinforcers 52 of the first series of reinforcers 52a that are proximal with respect to the sleeve 64 each comprise an opening 54 helping to delimit at least a part of the receiving housing 32.

According to the invention, and as shown in FIG. 4, the receiving housing 32 has an overall rectangular shape when viewed in a cross section inscribed in a plane perpendicular to the longitudinal direction L, having two major sides 33 with greater dimensions than the other two minor sides 31, a straight line D of the receiving housing 32 extending along one of the two major sides 33 of the rectangular shape of the receiving housing 32 cutting the receiving area 26.

The receiving housing 32 extends in a main plane of extension E parallel to the longitudinal direction L and to the straight line D, the main plane of extension E being viewed in a position passing through the centres of the minor sides 31 of said receiving housing 32, the main plane of extension E of the receiving housing 32 extending through the receiving area 26.

In other words, the receiving housing 32 extends in the inner volume of the adapter 1 so that the straight line D extends along one of the two major sides 33, passing through the receiving area 26, while the main plane of extension E passing through the centres of the minor sides 31 of the receiving housing 32 extends into both the receiving housing 32 and the receiving area 26. It is to be understood that the straight line D and the main plane of extension E extend into at least a part of the receiving area 26, but without passing through the receiving area 26 along a main dimension of said receiving area 26, the straight line D cutting, for example, the opening 67 and/or one or the other of the inner walls 20, 66.

It may also be defined that the straight line D is inclined with respect to a main plane of elongation of the first inner wall 20 and/or of the side wall 10, for example. In other words, the straight line D is at least secant with respect to the main plane of elongation of the first inner wall 20 and/or of the side wall 10.

For example, the straight line D is secant to the axis of rotation R of the adapter 1 within the receiving area 26. In another example, the straight line D cuts one of the elements of the rotation device 58 of the adapter 1, such as the male element 73 on the second inner wall 66 of the adapter or the female element 75 intended to interact with a male element of the connector 8.

As shown in FIGS. 3 to 5, the receiving housing 32 is laterally offset with respect to the receiving area 26. In other words, the position of the receiving housing 32 is offset with respect to the receiving area 26 in the transverse direction T. The position of the receiving housing 32 is also offset with respect to the receiving area 26 in the vertical direction T.

More precisely, the receiving housing 32 is nearer to the side wall 10 than the receiving area 26. In other words, the receiving housing 32 is positioned between the receiving area 26 and the side wall 10. Even more precisely, the receiving housing 32, the common edge 18 and the receiving area 26 are aligned along a direction parallel to the straight line D, the receiving housing 32 being positioned between the common edge 18 and the receiving area 26.

Additionally, the main plane of extension E of the receiving housing 32 is secant to a plane in which the axis of rotation R and the longitudinal direction are inscribed, at an angle of between 20° and 60°, preferably between 30° and 50°, and even more preferably between 35° and 45°. Additionally, as shown in FIGS. 3 and 5, the adapter 1 comprises a locking device 22 intended for fixing the adapter 1 longitudinally with respect to the arm 4 of the wiper system 6, the locking device 22 comprising at least one pushing member 28 and a locking member 30, the pushing member 28 being inscribed within a profile of the upper wall 12, while the locking member 30 extends at least partially into the receiving housing 32 intended to receive the arm 4. The pushing member 28 extends in a profile of the upper wall 12, the pushing member 28 being movable from the receiving housing 32 towards the first inner wall 20 of the adapter 1.

As shown in FIG. 5, at least the free end of the stalk 60 has a shape complementary to the receiving housing 32 of the adapter 1, the stalk 60 having a cut-out 62 interacting with the locking device 22 for longitudinally locking the position of the adapter 1 on the stalk 60. It is to be understood that the free end is positioned in the cut-out 62 of the stalk 60, so as to lock the stalk 60 longitudinally in the receiving housing 32.

It is to be understood that, in order to unlock the position of the adapter 1 on the arm 4, the locking device 22 is made to pivot about the pivoting direction until the limiting means 24 bears against the first inner wall 20. This pivoting is sufficient to unlock the position of the adapter 1 with respect to the arm 4, while limiting the risk of breakage of the casing of the locking device 22.

However, the present invention is not to be considered as being limited solely to the means and configurations described and illustrated here, but also extends to any equivalent means or configurations and to any technically operative combination of such means.

The invention claimed is:

1. An adapter for fastening a wiper blade unit to an arm of a wiper system, comprising:
    at least a side wall and an upper wall having at least one common edge between them, the side wall and the upper wall helping to define an inner volume of the adapter; a first inner wall and a second inner wall extending at least partially into the inner volume of the adapter, to delimit a receiving area configured to receive a connector of the wiper blade unit in a space between the first inner wall and the second inner wall; and
    at least one receiving housing, positioned between the first inner wall and the side wall, which is configured to receive the arm of the wiper system and which has a rectangular cross section defined by two major sides and two minor sides,
    wherein a straight line passing through one of the major sides cuts the receiving area configured to receive the connector,
    wherein the adapter extends in a longitudinal direction and is configured to be mounted on the connector of the wiper blade unit such that the adapter rotates about an axis of rotation transverse to the longitudinal direction, and
    wherein one minor side of the two minor sides is a portion of the side wall of the adapter such that the at least one receiving housing is further delimited by the side wall of the adapter.

2. The adapter according to claim 1, wherein the side wall and the upper wall each have a free edge and the edge common to the side wall and the upper wall, the adapter having a cross section which is triangular when viewed in a section plane perpendicular to the longitudinal direction and is defined by the free edge of the side wall, the free edge of the upper wall and the common edge between the side wall and the upper wall, the upper wall being curved between the common edge and its free edge when viewed in the section plane perpendicular to the longitudinal direction.

3. The adapter according to claim 1, further comprising at least one reinforcer extending between the first inner wall and the side wall and/or the upper wall.

4. The adapter according to claim 3, wherein the receiving housing is defined by a third portion comprising an opening formed in the reinforcer.

5. The adapter according to claim 3, comprising a first series of reinforcers that extend between the upper wall, the side wall and the first inner wall, and a second set of reinforcers that extend between the upper wall and the second inner wall, helping to define the receiving area, said receiving area extending between the first series of reinforcers and the second series of reinforcers.

6. The adapter according to claim 1, wherein the receiving housing is defined by a first portion comprising a sleeve.

7. The adapter according to claim 1, wherein the receiving housing is defined by a second portion opening into the inner volume.

8. The adapter according to claim 1, wherein the receiving housing is laterally offset with respect to the receiving area.

9. The adapter according to claim 1, wherein the receiving housing is positioned in the inner volume between the receiving area and the side wall.

10. The adapter according to claim 1, wherein the straight line passing through one of the major sides is secant to the axis of rotation of the adapter within the receiving area.

11. The adapter according to claim 1, comprising a locking device for fixing the adapter longitudinally with respect to the arm of the wiper system, the locking device comprising at least one pushing member and a locking member, the pushing member being inscribed within a profile of the upper wall, while the locking member extends at least partially into the receiving housing configured to receive the arm.

12. A connection device for a wiper blade unit, comprising:
    at least one connector, and
    an adapter according to claim 1;
    wherein the connector is mounted such that the connector is configured to be rotated about the axis of rotation of the adapter by a rotation device.

13. A wiper blade unit comprising at least a connection device according to claim 12.

14. A wiper system comprising at least an arm and a wiper blade unit according to claim 12, the arm comprising at least one stalk that is housed in the receiving housing of the adapter.

15. The wiper system according to claim 14, wherein at least a free end of the stalk has a shape complementary to the receiving housing of the adapter, the stalk having a cut-out interacting with a locking device for longitudinally locking a position of the adapter on the stalk.

* * * * *